US 9,905,184 B2

(12) United States Patent
Li

(10) Patent No.: US 9,905,184 B2
(45) Date of Patent: Feb. 27, 2018

(54) DISPLAY PANEL AND DISPLAY APPARATUS

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/324,203

(22) PCT Filed: Mar. 18, 2016

(86) PCT No.: PCT/CN2016/076671
§ 371 (c)(1),
(2) Date: Jan. 5, 2017

(87) PCT Pub. No.: WO2017/041468
PCT Pub. Date: Mar. 16, 2017

(65) Prior Publication Data
US 2017/0200426 A1  Jul. 13, 2017

(30) Foreign Application Priority Data
Sep. 8, 2015 (CN) .......................... 2015 1 0568132

(51) Int. Cl.
*G09G 3/36* (2006.01)
*G02F 1/1362* (2006.01)
(Continued)

(52) U.S. Cl.
CPC ..... *G09G 3/3677* (2013.01); *G02F 1/133345* (2013.01); *G02F 1/136227* (2013.01);
(Continued)

(58) Field of Classification Search
CPC .......... G09G 3/3677; G09G 2310/0243; G02F 1/136286; G02F 1/136227; G02F 1/133345; G02F 2201/0123; G04G 9/12
See application file for complete search history.

(56) References Cited

U.S. PATENT DOCUMENTS 4,527,863 A * 7/1985 Glasper .................. G09G 3/001
345/209
4,903,017 A * 2/1990 Wooller ............... G01C 23/005
340/967

(Continued)

FOREIGN PATENT DOCUMENTS

CN  101295081 A  10/2008
CN  105137632 A  12/2015
(Continued)

OTHER PUBLICATIONS

International Search report Form 210, 220, 237 dated Jun. 22, 2016 issued in corresponding International Application No. PCT/CN2016/076671 along with an English translation of the Written Opinion of the International Searching Authority.

*Primary Examiner* — Mihir K Rayan
(74) *Attorney, Agent, or Firm* — Nath, Goldberg & Meyer; Joshua B. Goldberg

(57) ABSTRACT

Provided are a display panel and a display apparatus. The display panel includes a plurality of first and second signal lines intersecting with and insulated from each other, pixel units are defined at positions where the first and second signal lines intersect with each other, the first signal lines are open-ring signal lines, the plurality of first signal lines are arranged one by one from inside to outside and spaced apart from each other, and each of the first signal lines surrounds a preceding one of the first signal lines. The display panel further includes a driving unit provided in a region defined by any one of the first signal lines. The driving unit is
(Continued)

connected to the second signal lines, and is connected to the first signal lines via the signal introducing lines, so as to provide driving signals to the first and second signal lines.

18 Claims, 2 Drawing Sheets

(51) Int. Cl.
    *G04G 9/12*         (2006.01)
    *G02F 1/1333*     (2006.01)

(52) U.S. Cl.
    CPC ......... *G02F 1/136286* (2013.01); *G04G 9/12* (2013.01); *G02F 2201/123* (2013.01); *G09G 2310/0243* (2013.01)

(56) References Cited

U.S. PATENT DOCUMENTS

| | | | | |
|---|---|---|---|---|
| 4,968,119 | A * | 11/1990 | Stewart | G02F 1/1368 349/43 |
| 5,474,942 | A * | 12/1995 | Kodaira | H01L 27/1248 257/E23.157 |
| 6,675,650 | B1 * | 1/2004 | Paulo | B60K 35/00 324/115 |
| 9,312,284 | B2 * | 4/2016 | Wu | H01L 27/124 |
| 2005/0140907 | A1 * | 6/2005 | Yun | G02F 1/133514 349/144 |
| 2006/0077191 | A1 * | 4/2006 | Ming-Daw | G02F 1/133351 345/204 |
| 2007/0222936 | A1 * | 9/2007 | Shih | G02F 1/136286 349/187 |
| 2008/0266210 | A1 * | 10/2008 | Nonaka | G09G 3/20 345/55 |
| 2009/0096975 | A1 * | 4/2009 | Kwon | H01L 27/1259 349/139 |
| 2009/0102824 | A1 * | 4/2009 | Tanaka | G02F 1/134309 345/205 |
| 2009/0128313 | A1 * | 5/2009 | Lux | B60K 35/00 340/441 |
| 2009/0167654 | A1 * | 7/2009 | Kim | G02F 1/1345 345/87 |
| 2010/0295764 | A1 * | 11/2010 | Wang | G02F 1/136286 345/92 |
| 2014/0049464 | A1 * | 2/2014 | Kwak | G06F 3/0487 345/156 |
| 2014/0253419 | A1 * | 9/2014 | Tanada | G09G 3/2092 345/55 |
| 2016/0246114 | A1 * | 8/2016 | Kawamura | G02F 1/133528 |
| 2016/0328071 | A1 * | 11/2016 | Yan | G06F 3/0412 |
| 2016/0351107 | A1 * | 12/2016 | Chen | G09G 3/20 |
| 2017/0221927 | A1 * | 8/2017 | Li | H01L 27/127 |
| 2017/0248810 | A1 * | 8/2017 | Shibano | G02F 1/133345 |
| 2017/0263648 | A1 * | 9/2017 | Li | H01L 27/1214 |
| 2017/0301314 | A1 * | 10/2017 | Kim | G09G 5/14 |

FOREIGN PATENT DOCUMENTS

| | | | |
|---|---|---|---|
| CN | 204903904 U | 12/2015 | |
| JP | 2005-79472 A | 3/2005 | |
| WO | PCT/CN2015/071117 | * 6/2016 | ........... G06F 1/1362 |

* cited by examiner

DISPLAY PANEL AND DISPLAY APPARATUS

This is a National Phase Application filed under 35 U.S.C. 371 as a national stage of PCT/CN2016/076671, filed Mar. 18, 2016, an application claiming the benefit of Chinese Application No. 201510568132.9, filed Sep. 18, 2015 in the State Intellectual Property Office (SIPO) of China, the contents of which are herein incorporated by reference in their entirety.

FIELD OF THE INVENTION

The present invention belongs to the field of display technology, and specifically relates to a display panel and a display apparatus.

BACKGROUND

In recent years, a liquid crystal display, due to its advantages such as low operating voltage, low power consumption, low radiation, small space occupancy, thin and beautiful appearance and the like, has been increasingly popularized and has become a mainstream display device in the market. Technology innovation in the field of liquid crystal display derives from various demands of people for life and insatiable appetite of researchers for product development.

A wearable smart watch is a new product in the field of liquid crystal display. However, like conventional display panels, a smart watch in the related art has a watch face with a bezel, and therefore, further narrowing or removing the bezel of the watch face of a smart watch has become an urgent technical problem to be solved.

SUMMARY

In order to at least solve the above problems in the existing smart watches, embodiments of the present invention provide a display panel and a display apparatus which can realize a rimless design.

An embodiment of the present invention provides a display panel, which includes a plurality of first signal lines and a plurality of second signal lines configured to intersect with and be insulated from each other, pixel units defined at positions where the first signal lines and the second signal lines intersect with each other, a driving unit provided in a region defined by any one of the first signal lines, and a plurality of signal introducing lines connected to the driving unit. Each of the first signal lines has a shape of open ring, the plurality of first signal lines are arranged one by one from inside to outside and spaced apart from each other, and each of the first signal lines surrounds a preceding one of the first signal lines; the driving unit is connected to the second signal lines, and is connected to the first signal lines via the signal introducing lines, so as to provide driving signals to the first and second signal lines.

The driving unit may be provided in a region defined by the first signal line located at the innermost side.

The plurality of first signal lines may be arranged to be spaced apart from each other from inside to outside with respect to a same center.

Spacing between any two adjacent first signal lines may be the same.

The plurality of signal introducing lines may be evenly arranged in the display panel.

The plurality of first signal lines may have a same resistance.

The plurality of first signal lines may include a same material, and line widths of the plurality of first signal lines may be gradually increased in a direction away from the driving unit.

The display panel may further include: a gate insulation layer provided between the first signal lines and the second signal lines, wherein the first signal lines are arranged above the second signal lines; a passivation layer provided on the first signal lines; and a pixel electrode provided on the passivation layer.

Each of the signal introducing lines may include a connection portion provided at the same layer as the second signal lines and connected to the driving unit, and a conductive portion provided at the same layer as the pixel electrode and connected to the connection portion as well as a corresponding first signal line.

The conductive portion may be connected to the connection portion through a first via penetrating through the gate insulation layer and the passivation layer, and may be connected to the corresponding first signal line through a second via penetrating through the passivation layer.

The connection portion and the second signal lines may include a same material, and the conductive portion and the pixel electrode may include a same material.

Each of the first signal lines may have a shape of circular open ring, square open ring or triangular open ring.

Each of the pixel units may have a circular shape or a trapezoid shape.

The first signal lines are gate lines, and the second signal lines are data line; or the second signal lines are gate lines, and the first signal lines are data lines.

Each of the first signal lines may be connected to at least one of the signal introducing lines.

The number of the signal introducing lines connected to the first signal line at a relatively outer side may be greater than that of the signal introducing lines connected to the first signal line at a relatively inner side.

An embodiment of the present invention also provides a display apparatus including the above-described display panel.

The display apparatus may be any one of a watch, a dashboard and a clock.

In the display panel provided in the embodiments of the present invention, the driving unit (which may include a source driving chip and a gate driving chip) is provided in a region defined by any one of the first signal lines, that is, the driving unit is located in a pixel region of the display panel, and thus avoids occupying a bezel area of the display panel, so a rimless design of display panel is achieved.

DETAILED DESCRIPTION

To make those skilled in the art better understand the technical solutions of the present invention, the present invention will be further described in detail below in conjunction with the accompanying drawings and specific implementations.

Embodiments of the present invention provide a display panel including a plurality of first signal lines and a plurality of second signal lines configured to intersect with and be insulated from each other. Pixel units are defined at positions where the first signal lines and the second signal lines intersect with each other. The first signal lines are open-ring signal lines. The plurality of first signal lines are arranged one by one from inside to outside and are spaced apart from each other, and each of the first signal lines surrounds a preceding one of the first signal lines. The display panel further includes a driving unit provided in a region defined by any and all of the first signal lines. The driving unit is connected to the second signal lines, and is connected to the first signal lines via signal introducing lines, so as to provide driving signals to the first and second signal lines.

In the display panel of the embodiments of the present invention, the driving unit (which may include a source driving chip and a gate driving chip) is provided in a region defined by any one of the first signal lines, that is, the driving unit is located in a non-display area of a pixel region of the display panel, and thus avoids occupying a bezel area of the display panel, so a rimless design of display panel is achieved. In some embodiments, the first signal lines may be data lines, and the second signal lines may be gate lines. However, the embodiments of the present invention are not limited thereto. In other embodiments, the first signal lines may be gate lines and the second signal lines may be data lines.

Figure 1:
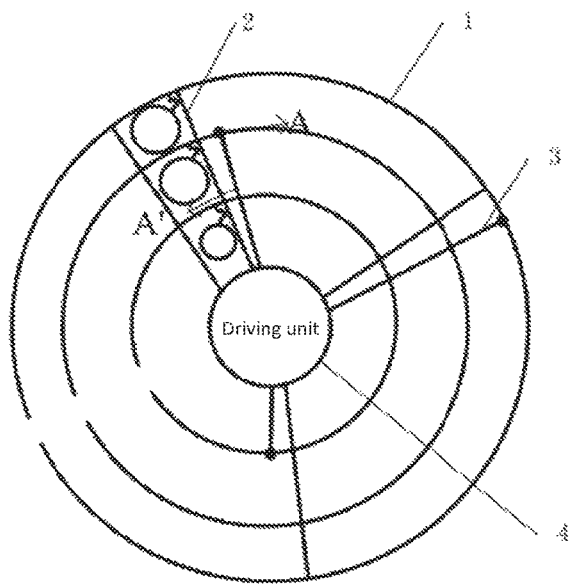
FIG. 1 is a schematic diagram of a display panel according to an embodiment of the present invention.
Figure 2:
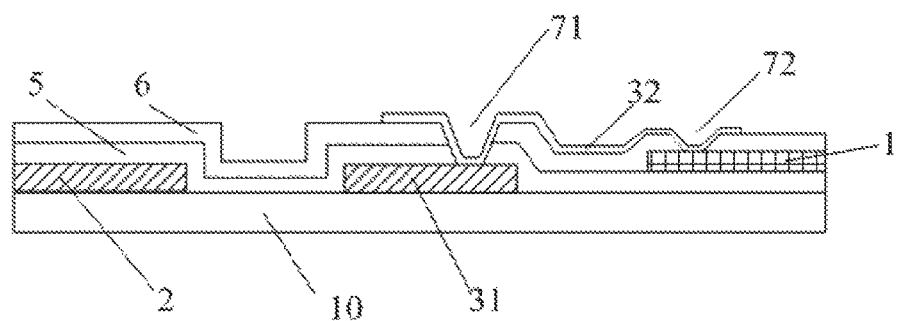
FIG. 2 is a cross sectional diagram taken along line A-A' in FIG. 1.

Specifically, FIG. 1 is a schematic diagram of a display panel according to an embodiment of the present invention, and FIG. 2 is a cross sectional diagram of the display panel. As illustrated in FIGS. 1 and 2, the display panel includes a substrate 10, a plurality of gate lines 2 provided on the substrate 10, connection portions 31 of signal introducing lines 3 provided at the same layer as the gate lines 2, a gate insulation layer 5 provided on the gate lines 2, a plurality of concentric open-ring data lines 1 provided on the gate insulation layer 5, a passivation layer 6 provided on the data lines 1, a pixel electrode provided on the passivation layer 6, conductive portions 32 of the signal introducing lines 3 provided at the same layer as the pixel electrode, and a driving unit 4 provided in a region defined by the data line 1 having a minimum length, i.e., the data line 1 located at the innermost ring. In the display panel, the gate lines 2 are directly connected to the driving unit 4, the connection portion 31 is connected to the conductive portion 32 through a first via 71 penetrating through the gate insulation layer 5 and the passivation layer 6, the conductive portion 32 is further connected to the data lines 1 through a second via 72 penetrating through the passivation layer 6, and the connection portion 31 of the signal introducing line 3 at another end is connected to the driving unit 4. The driving unit 4 provides a gate scan signal(s) to the gate lines 2, and provides a data voltage signal(s) to the data lines 1.

In the display panel of this embodiment, the driving unit 4 is in the region defined by the data line 1 at the innermost ring, and thus avoids occupying a bezel area of the display panel, so a rimless design of display panel is achieved. In particular, in designs where the display panel is applied to a smart watch, a dashboard, a clock or the like, the driving unit 4 is arranged at a central position of the display panel, i.e., a position at which a pointer of a smart watch, a dashboard, a clock or the like is provided, and this position is in the non-display area, so the driving unit 4 arranged at the central position of the display panel will not affect the aperture ratio of the display panel.

It can be understood that one data line 1 may be connected to the driving unit 4 through one signal introducing line 3, that is, the number of the signal introducing lines 3 and the number of the data lines 1 may be the same, and therefore, an appropriate arrangement of the signal introducing lines 3 can improve uniformity of the display panel. In this embodiment, the signal introducing lines 3 are evenly distributed over the display panel so as to make the wiring in display panel uniform and avoid the occurrence of a dark zone in the display panel due to the concentrated arrangement of the signal introducing lines 3.

In the display panel of this embodiment, pixel units are defined at a positions where the gate lines 2 and the data lines 1 intersect with each other, and each pixel unit includes a thin film transistor which has a gate electrode connected to the gate line 2, a source electrode connected to the data line 1, and a drain electrode connected to the pixel electrode. In this embodiment, a distance between any two adjacent data lines 1 of the display panel may be the same, while the respective gate lines 2 may also be evenly arranged in the display panel so that the pixel units defined between two adjacent data lines 1 are uniform in size in the display panel, and the sizes of the pixel units arranged from the inner-ring data line 1 to the outer-ring data line 1 vary regularly so that the display panel has a better display effect.

As illustrated in FIG. 2, in this embodiment, the gate insulation layer 5 is provided between the gate lines 2 and the data lines 1, and the gate lines 2 are provided at the same layer as the signal introducing lines 3, i.e., the connection portions 31, and therefore a pattern of the gate lines 2 and a pattern of the connection portions 31 of the signal introducing lines 3 may be formed by a same patterning process.

In the display panel of this embodiment, each data line 1 has a same resistance so that the degree of signal delay in each data line 1 is the same. For example, each data line 1 may be made of a same material, and line widths of the data lines 1 may be gradually increased in a direction away from the driving unit 4 such that each data line 1 has a same resistance. However, the present invention is not limited thereto, and in other embodiments, the data lines 1 may be formed of materials with different resistivities such that each data line 1 has a same resistance.

In the embodiments of the present invention, each data line 1 may have a shape of circular open ring, square open ring or triangular open ring. FIG. 1 illustrates an example in which each data line 1 has a shape of circular open ring, but the present invention is not limited thereto.

Figure 3:
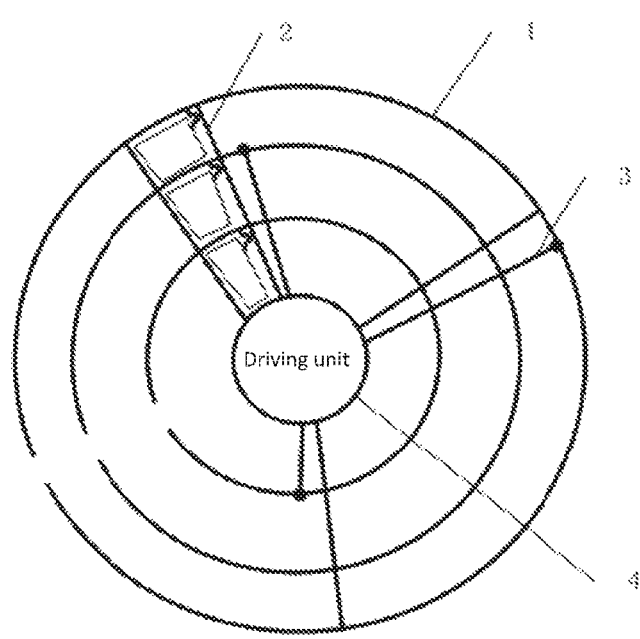
FIG. 3 is a schematic diagram of a display panel according to an embodiment of the present invention.

In addition, FIG. 1 illustrates an example in which each pixel unit has a circular shape, but the present invention is not limited thereto. In other embodiments, the pixel units may also have other shape. FIG. 3 is a schematic diagram of a display panel according to an embodiment of the present invention. As illustrated in FIG. 3, each pixel unit has a trapezoid shape.

In the embodiments of the present invention, each of the data lines 1 may be connected to multiple signal introducing lines 3, that is, a data signal may be provided to each of the data lines by multiple signal introducing lines 3, which thus can alleviate voltage drops of the respective pixel units on the data lines 1. In addition, the number of the signal introducing lines 3 connected to the data line 1 having a larger length (i.e., the data lines 1 at a relatively outer side) may be greater than that of the signal introducing lines 3 connected to the data line 1 having a smaller length (i.e., the data lines 1 at a relatively inner side).

Furthermore, in particular, in the embodiments of the present invention, in a case where the first signal lines are the gate lines 2, each of the gate lines 2 may drive the gate electrodes through multiple signal introducing lines 3 so that the signal delay of each pixel unit can be substantially the same.

It needs to be set forth that, in the embodiments of the present invention, the gate lines 2 may also be located below the data lines 1, and in this case, the signal introducing lines 3 (i.e., the connection portions 31) are provided at the same layer as the data lines 1, and the signal introducing lines 3 (i.e., the connection portions 31) are connected to the gate lines 2 through respective vias penetrating through the insulation layer so as to transmit the gate scan signals provided by the driving unit 4 to the gate lines 2. In addition, the principle of realizing a rimless design is the same as that described above and no longer described in detail herein.

Embodiments of the present invention also provide a method for fabricating the display panel. The structure of the display panel in the above embodiments may be further described in conjunction with the method for fabricating the display panel below.

The method of this embodiment includes steps one to six as follows.

Step one includes forming, on a substrate, a pattern including the gate electrodes of the thin film transistors, the gate lines 2, and the connection portions 31 of the signal introducing lines 3 by a patterning process.

In this step, the gate lines 2, the gate electrodes, and the connection portions 31 of the signal introducing lines 3 may be made of a same material, and the gate lines 2 may be a single layer or a multi-layer composite laminate formed of one or more of molybdenum (Mo), molybdenum-niobium alloy (MoNb), aluminum (Al), aluminum-neodymium alloy (AlNd), titanium (Ti) and copper (Cu). In some embodiments, the gate lines 2 may include a single layer or a multi-layer composite film formed of Mo, Al or formed of an alloy containing Mo, Al.

Step two includes forming the gate insulation layer 5.

In this step, the gate insulation layer 5 may be made of one of silicon oxide (SiOx), silicon nitride (SiNx), hafnium oxide (HfOx), silicon oxynitride (SiON), aluminum oxide (AlOx) and the like, or may include a multi-layer composite film formed of two of the above materials.

Step three includes forming a pattern including an active layer by a patterning process.

In this step, the active layer may be formed of polysilicon, amorphous silicon or the like, or may be a film containing elements such as In (indium), Ga (gallium), Zn (zinc), O (oxygen) and Sn (tin), in which the element oxygen and two or more of the other elements are necessarily contained, for example, the film may include indium gallium zinc oxide (IGZO), indium zinc oxide (IZO), indium tin oxide (InSnO), indium gallium tin oxide (InGaSnO) or the like. In some embodiments, the oxide semiconductor active layer may include IGZO and IZO.

Step four includes forming a pattern including the source electrodes, the drain electrodes and the data lines 1 by a patterning process.

In this step, the source electrodes, the drain electrodes and the data lines 1 may be a single layer or a multi-layer composite laminate formed of one or more of molybdenum (Mo), molybdenum-niobium alloy (MoNb), aluminum (Al), aluminum-neodymium alloy (AlNd), titanium (Ti) and copper (Cu). In some embodiments, the source electrodes, the drain electrodes and the data lines 1 may include a single layer or a multi-layer composite film formed of Mo, Al or an alloy containing Mo, Al.

Step five includes: forming the passivation layer 6; and forming, above the connection portion 31, the first via 71 penetrating through the gate insulation layer 5 and the passivation layer 6, forming, above the data line 1, the second via 72 penetrating through the passivation layer 6, and forming, above the drain electrode, a third via penetrating through the passivation layer 6.

In this step, material of the passivation layer 6 may be silicon oxide, silicon nitride, aluminum oxide, or the like.

Step 6 includes forming, by a patterning process, a pattern including the pixel electrode and the conductive portions 32 of the signal introduction lines 3, such that one end of the conductive portion 32 is connected to the connection portion 31 through the first via 71 and the other end thereof is connected to the data line 1 through the second via 72.

In this step, material of the pixel electrode and the conductive portions 32 may be indium tin oxide. In other embodiments, other transparent conductive materials may be adopted.

Embodiments of the present invention further provide a display apparatus including the above-described display panel. The display apparatus may be any product or component with a function of display such as a watch, a dashboard, a clock or the like.

Since the display apparatus of this embodiment includes the above-described display panel, a rimless design can be realized.

It can be understood that the foregoing embodiments are merely exemplary embodiments used for describing the principle of the present invention, but the present invention is not limited thereto. Those of ordinary skill in the art may make various variations and improvements without departing from the spirit and essence of the present invention, and these variations and improvements shall also fall into the protection scope of the present invention.

What is claimed is:

1. A display panel, comprising:
  a plurality of first signal lines and a plurality of second signal lines configured to intersect with and be insulated from each other;
  pixel units defined at positions where the first signal lines and the second signal lines intersect with each other;
  a driving unit provided in a region defined by any one of the first signal lines; and
  a plurality of signal introducing lines connected to the driving unit, wherein
  each of the first signal lines has a shape of open ring, the plurality of first signal lines are arranged one by one from inside to outside and spaced apart from each other, and each of the first signal lines surrounds a preceding one of the first signal lines, such that lengths of the first signal lines are increased one by one from inside to outside; and
  the driving unit is connected to the second signal lines, and is connected to the first signal lines via the signal introducing lines, so as to provide driving signals to the first and second signal lines.

2. The display panel according to claim 1, wherein the driving unit is provided in a region defined by the first signal line located at the innermost side.

3. The display panel according to claim 1, wherein the plurality of first signal lines are arranged to be spaced apart from each other from inside to outside with respect to a same center.

4. The display panel according to claim 3, wherein spacing between any two adjacent ones of the first signal lines is the same.

5. The display panel according to claim 1, wherein the plurality of signal introducing lines are evenly arranged in the display panel.

6. The display panel according to claim 1, wherein the plurality of first signal lines have a same resistance.

7. The display panel according to claim 6, wherein the plurality of first signal lines include a same material, and line widths of the plurality of first signal lines is gradually increased in a direction away from the driving unit.

8. The display panel according to claim 1, further comprising:
   a gate insulation layer provided between the first signal lines and the second signal lines, the first signal lines being arranged above the second signal lines;
   a passivation layer provided on the first signal lines; and
   a pixel electrode provided on the passivation layer.

9. The display panel according to claim 8, wherein each of the signal introducing lines comprises:
   a connection portion provided at the same layer as the second signal lines and connected to the driving unit; and
   a conductive portion provided at the same layer as the pixel electrode and connected to the connection portion and a corresponding first signal line.

10. The display panel according to claim 9, wherein the conductive portion is connected to the connection portion through a first via penetrating through the gate insulation layer and the passivation layer, and is connected to the corresponding first signal line through a second via penetrating through the passivation layer.

11. The display panel according to claim 9, wherein the connection portion and the second signal lines include a same material, and the conductive portion and the pixel electrode include a same material.

12. The display panel according to claim 1, wherein each of the first signal lines has a shape of circular open ring, square open ring or triangular open ring.

13. The display panel according to claim 1, wherein each of the pixel units has a circular shape or a trapezoid shape.

14. The display panel according to claim 1, wherein the first signal lines are gate lines, and the second signal lines are data line, or
   the second signal lines are gate lines, and the first signal lines are data lines.

15. The display panel according to claim 1, wherein each of the first signal lines is connected to at least one of the signal introducing lines.

16. The display panel according to claim 15, wherein the number of the signal introducing lines connected to the first signal line at a relatively outer side is greater than that of the signal introducing lines connected to the first signal line at a relatively inner side.

17. A display apparatus, comprising the display panel according to claim 1.

18. The display apparatus according to claim 17, wherein the display apparatus is any one of a watch, a dashboard and a clock.

* * * * *